United States Patent [19]
Migozzi et al.

[11] Patent Number: 5,170,153
[45] Date of Patent: Dec. 8, 1992

[54] OPTICAL DEVICE FOR THE DISPLAY OF LIGHT DATA COLLIMATED TO INFINITY

[75] Inventors: Jean-Blaise Migozzi, Orsay; Serge Ediar, St. Medard en Jalles, both of France

[73] Assignee: Sextant Avionique, Meudon la Foret, France

[21] Appl. No.: 621,879

[22] Filed: Dec. 4, 1990

[30] Foreign Application Priority Data

Dec. 12, 1989 [FR] France .................. 8916397

[51] Int. Cl.⁵ ............................................. G05G 3/02
[52] U.S. Cl. ...................................... 340/705; 359/630
[58] Field of Search ............... 340/705, 980; 351/209, 351/210, 211; 128/745; 359/630

[56] References Cited

U.S. PATENT DOCUMENTS

| | | | |
|---|---|---|---|
| 3,915,548 | 10/1975 | Opittek et al. | 340/705 |
| 4,028,725 | 6/1977 | Lewis . | |
| 4,109,145 | 8/1978 | Graf | 340/706 |
| 4,349,815 | 9/1982 | Spooner | 340/705 |
| 4,439,755 | 3/1984 | LaRussa | 340/980 |
| 4,880,287 | 11/1989 | Moss | 350/174 |
| 4,897,715 | 1/1990 | Beamon, III | 340/705 |
| 4,950,069 | 8/1990 | Hutchinson | 351/210 |

FOREIGN PATENT DOCUMENTS

| | | |
|---|---|---|
| 0273783 | 7/1988 | European Pat. Off. . |
| 2009071 | 6/1979 | United Kingdom ............ 340/705 |
| 1578136 | 11/1980 | United Kingdom . |
| 2115946 | 9/1983 | United Kingdom . |

*Primary Examiner*—Alvin E. Oberley
*Assistant Examiner*—Matthew Luu
*Attorney, Agent, or Firm*—Oblon, Spivak, McClelland, Maier & Neustadt

[57] ABSTRACT

In an optical device for the display of light data collimated to infinity, an image generator associated with a collimation optical device gives the eye an image collimated to infinity. The light source that illuminates the image generator is controlled so that the position of its illuminating part is such that it gives a narrow beam with an image of this illuminating part centered on the pupil of the eye. This is possible by means of an oculometer that determines the coordinates of the center of the pupil of the eye and delivers a signal enabling an automatic control circuit to adjust the position of the illuminating part of the source accordingly. The device can be applied to pilots' helmets for the display of data overlaid on the landscape.

5 Claims, 3 Drawing Sheets

OPTICAL DEVICE FOR THE DISPLAY OF LIGHT DATA COLLIMATED TO INFINITY

BACKGROUND OF THE INVENTION

The present invention relates to optical devices for the display of luminous or light data collimated to infinity, this data being generally but not obligatorily overlaid on the view of the external landscape. Such devices, with which aircraft are fitted out, may be mounted either on an instrument panel in the head-up position or on a pilot's helmet. They are used mainly as navigational aids and in gun sighting devices.

There is a growing need for light data in aircraft, and the images produced need to have ever bigger fields with an optical quality that should remain sufficient throughout the field, irrespectively of the position of observation of the eyes.

This has gradually led to optical devices having a large number of lenses, at least six of them, hence to optical devices that are bulky and heavy, making it difficult to mount these devices in pilots' helmets.

SUMMARY OF THE INVENTION

The aim of the invention is to reduce the number of these lenses for an even wider field with an image resolution that is of equally good quality.

This is obtained, in particular, by forming the exit pupil of the optical device permanently on the pupil of the eye and by reducing it to a dimension far smaller than that of the pupil of the eye.

According to the present invention, there is proposed an optical device for the display of light data collimated to infinity, comprising display means, an oculometer and an automatic control circuit, wherein the display means include an image generator to give an image and a collimation optical piece to receive the image given by the generator and to give a human eye an image collimated to infinity from the image given by the generator, wherein the display means have an exit pupil with a diameter smaller than that of the pupil of the eye, the position of said exit pupil being adjustable, wherein the oculometer is designed to give a position signal, representing the coordinates of the center of the pupil of the eye, and wherein the automatic control circuit is designed to receive the position signal and to apply a command to the display means so that the exit pupil is centered on the pupil of the eye.

BRIEF DESCRIPTION OF THE DRAWINGS

The present invention will be understood more clearly and other characteristics will appear from the following description and the figures pertaining thereto. Of these figures.

In the different figures, the corresponding elements are designated by the same references.

MORE DETAILED DESCRIPTION

Figure 1:
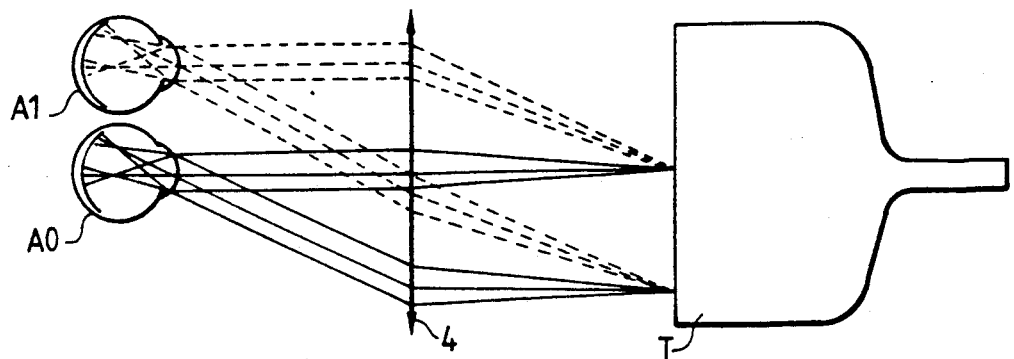
FIG. 1 shows a simplified drawing of an optical device according to the prior art.

FIG. 1 shows a cathode-ray tube T that emits rays in every direction and thus illuminates a collimation optical piece 4, which makes these rays substantially parallel to one another; the image of the tube given by the optical device is said to be collimated to infinity. In fact the rays, at the output of the optical device 4, are not quite parallel. The defect of parallelism or parallax defect may arise out of a poor focusing of the tube at the focal point of the optical piece, residual aberrations that it has not been possible to correct during the computation of optimization of this optical device (such as a spherical aberration, a coma, astigmatism, field curvature etc.), or machining or assembly defects (off-centering, inclination etc.).

For a given position of the eye in the output beam of the optical device, the pupil receives rays coming from various points of the tube. The formation, on the retina, of the rays corresponding to one and the same point of the tube creates not a dot but a spot which is all the greater as the above defects are great. The image seen is therefore sharp in varying degrees. This image can be improved only by adding lenses to the optical device.

By sharply restricting the section of a light beam, which transmits an image and penetrates the pupil of the eye, the number of aberrant rays is reduced. And, when the impact spot of this beam on the retina becomes a pinpoint spot, a higher resolution of the image is obtained, even when the optical device used to transmit the image has only one or two optical elements.

The diameter of the exit pupil of an optical device cannot be reduced indefinitely because of the diffraction which will affect the quality of the image. A good compromise is got by choosing a diameter of some tenths of a millimeter. In letting the rays go through a hole of this dimension, the aberrations of the optical piece become negligible and, although the diffraction is visible on very small dots, it cannot be seen in the patterns, used in the viewfinders, which have a line thickness close to or greater than one milliradian. Now, the pupil of the eye has a diameter that varies naturally between 2 mm and 8 mm depending on the light environment.

Figure 2:
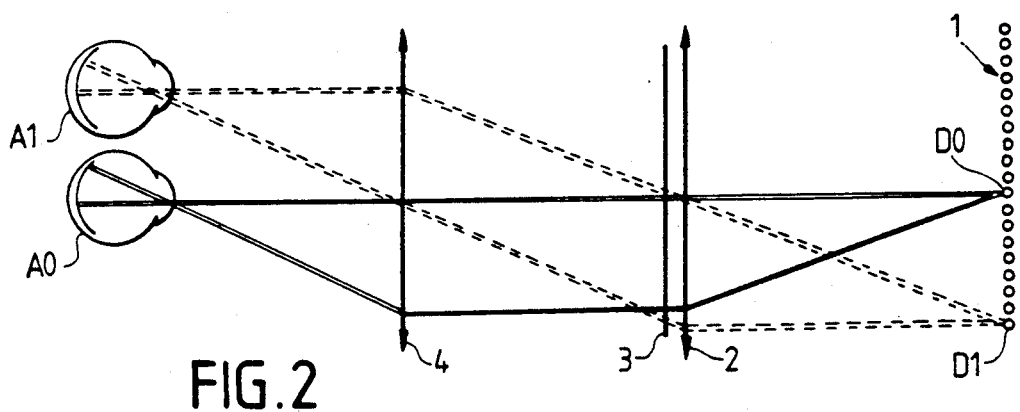
FIG. 2 shows a simplified drawing of an optical device according to the invention.

FIG. 2 is a schematic cross-sectional view of an optical display device according to the invention, with an eye, shown in two different positions, A0 and A1, in a zone where it is planned to make the display.

The device includes the following in series: a light source 1 formed by a plane matrix of electroluminescent diodes, an optical condenser 2, an image generator 3 and a collimation optical piece 4.

The light given by a source is considered to be coherent when the source emits light in a cone with an angle smaller than or equal to the diffraction cone. For the image generator 3 to be illuminated with coherent light, it is necessary for each dot of this generator to be illuminated by a very thin beam. To illuminate the image generator 3, the very thin beams are obtained by the formation, on the pupil of the eye, of the image of a diode of the matrix, i.e. depending on the position of the eye, it will be that diode, of the diodes of the source 1, having its image formed on the pupil of the eye, that will illuminate the eye. Thus, in the position A0, it is the diode D0 that will illuminate the eye while, in the position A1, it is the diode D1 that will illuminate the eye. Thus the aberration spot on the retina of the eye is greatly reduced, so much so that the image, seen by the eye, of the image that is given by the generator and collimated to infinity, is sharp even if the optical piece 4 is aberrant. A good field depth is obtained and the optical collimation piece can be shifted in relation to the image generator 3 in order to modify the enlargement of the image without, for all that, disturbing the sharpness of the image viewed.

It was said that, in the optical device according to FIG. 2, the light source 1 was a matrix of electroluminescent diodes. The embodiments that shall be described with the help of FIGS. 3 and 4 also each include a source of this type, but other types of sources may be used. Thus, for example, the source could be formed by a simple electroluminescent diode, an incandescent filament lamp, a laser etc. In these three cases, the source will be shifted or its light will be deflected as a function of the movements of the eye so that its image is formed permanently on the pupil of the eye. Furthermore, and especially in the case of the electroluminescent diodes and incandescent filament lamps, an optical reduction could be necessary to give a sufficiently thin beam. It is also possible to combine the image generator and the pinpoint source in projecting the image directly on the retina of the eye through a scan by a directional beam, of the television scanning type, emitted for example by a laser.

It has to be noted that the making of a very thin light beam requires that there should be no scattering element between the light source and the eye. This is why, in the exemplary embodiments described by means of FIGS. 3 and 4, the image generator is formed by a non-scattering liquid crystal panel placed between two polarizers. But other possibilities are available for making the image generator, especially the one mentioned above which groups together the light source and the generator by means of a laser. As an image generator, it is also possible to use a single-axis and polar liquid crystal type of matrix valve with its two polarizers placed on either side.

In the foregoing, it has been said that the light beam should follow the movements of the eye. To know its movements, an oculometer will be used in the embodiments according to FIGS. 3 and 4. An oculometer is an instrument that observes the eye and, through analysis of the observed image, gives the coordinates of the center of the iris. An instrument such as this is described, for example, in the French patent No. 2 522 804 filed on Mar. 5, 1982.

Figure 3:
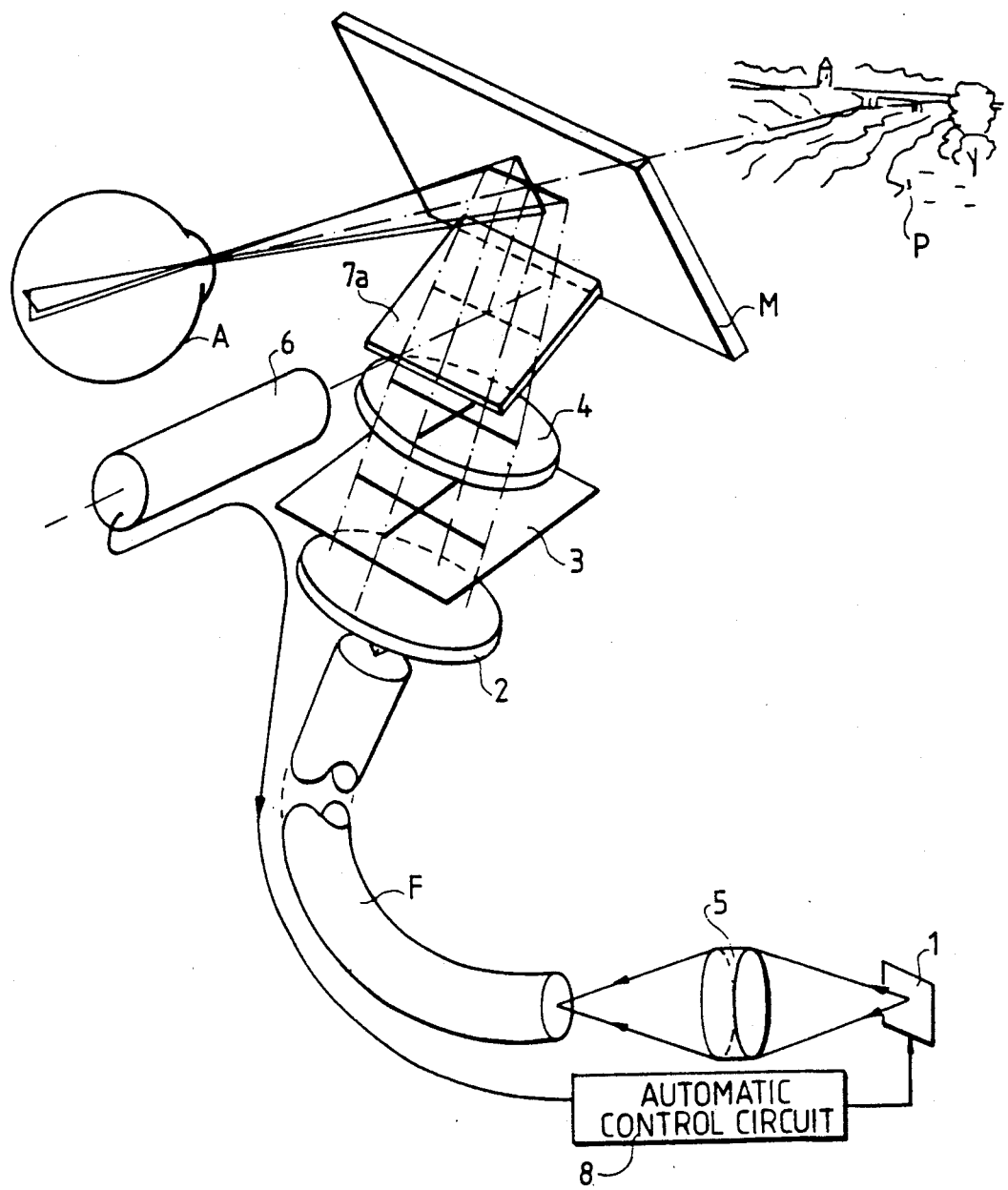
FIGS. 3 and 4 show detailed views of optical devices according to the invention.

FIG. 3 is a drawing of an optical device according to the invention, shown in greater detail than in FIG. 2.

FIG. 3 shows a light source 1, formed by a matrix of electroluminescent diodes. A projection optical piece, formed by lenses, gives an image of the diodes at the input of a bundle of optical fibers F, the output of which is placed on an aircraft pilot's helmet (not shown). A condenser 2 converts the light beam, which emerges from the output of the fibers F, into a beam of parallel rays that goes through an image generator 3 formed by a liquid crystal panel placed between two polarizers. This generator is shown generating the image of a cross. The circuits and connections associated with the panel to generate images have not been drawn in FIG. 3. The beam is then focused by a collimation optical piece 4 on the pupil of an observer's eye, A, after having gone through a separating glass 7a and after being reflected on a mixing mirror M. The separating glass and the mixing mirror M are semi-transparent mirrors that respectively enable:

the observer's eye A to look at the landscape placed before him, through the mixing mirror M, an oculometer 6 to monitor the movements of the eye A, the monitoring being done along an optical path that includes a reflection on each of the two semi-transparent mirrors M and 7a.

The oculometer 6 is borne by the observer's helmet, i.e. it is fixedly joined to the optical elements from the output of the fibers F upto and including the mixing mirror M. It determines the position of the eye by the coordinates of the center of the pupil of the eye in relation to these optical elements and sends this positional information, in the form of an electrical signal, to an automatic control circuit 8. The circuit 8 has a memory in which there are stored the addresses of the electroluminescent diodes of the source 1 which are to be lit up as a function of the position of the eye. A diode is lit up when its image, namely the exit pupil of the device, is at the center of the pupil of the eye where it constitutes an illuminated zone. In fact, in the example described, it is nine diodes that are lit up simultaneously, and these nine diodes are arranged in a three-by-three square. Again in the example described, the illuminated zone of the pupil of the eye has a diameter of 0.6 mm, and the shifts of this zone are made in 0.2 mm steps to follow the 2.6 mm movements of the eye on either side of a central point. These movements of the eye correspond to a display having a 30-degree field.

Figure 5:
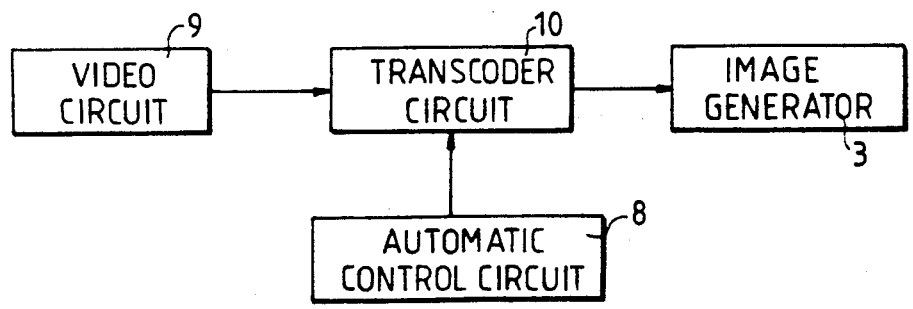
FIG. 5 shows the diagram of an electronic assembly designed for the optical devices according to FIGS. 3 and 4.

As the automatic control circuit 8 causes a narrow beam, that reaches substantially the center of the pupil of the eye A, to correspond with each dot of the image prepared by the image generator 3, the image seen by the eye is a sharp one. However, because of the defects of the different optical elements and, in particular, the defects of the collimation optical piece 3, this image may undergo distortions. Now, these distortions are a function of the optical path taken by the rays of the beam, namely of the position of the diodes that are lit up. Since, in an optical system, there are known ways of determining the distortion given by the system to the image for each path, it is possible to correct this distortion by producing the reverse effect in the image generator 3. Thus, for example, when a square in the image generator is seen as a cushion, a barrel-shaped correction at the generator enables the eye to see a square. Whenever the eye moves, the correction to be made to the image generator 3 must be adapted to the position of the diodes which are lit up in the light source 1. This is achieved by means of the assembly according to FIG. 5. When this correction does not exist, the image generator 3 receives its input signals directly from a video circuit 9. FIG. 5 shows that the correction is made by the interposition, between the video circuit 9 and the image generator 3, of a transcoder circuit 10 which receives the coordinates of the lit-up diodes from the automatic control circuit 8 and, as a function of these coordinates, corrects the theoretical coordinates of the image dots given by the video circuit. The transcoder circuit is therefore a circuit for the control of special effects of the type used in television.

Figure 4:
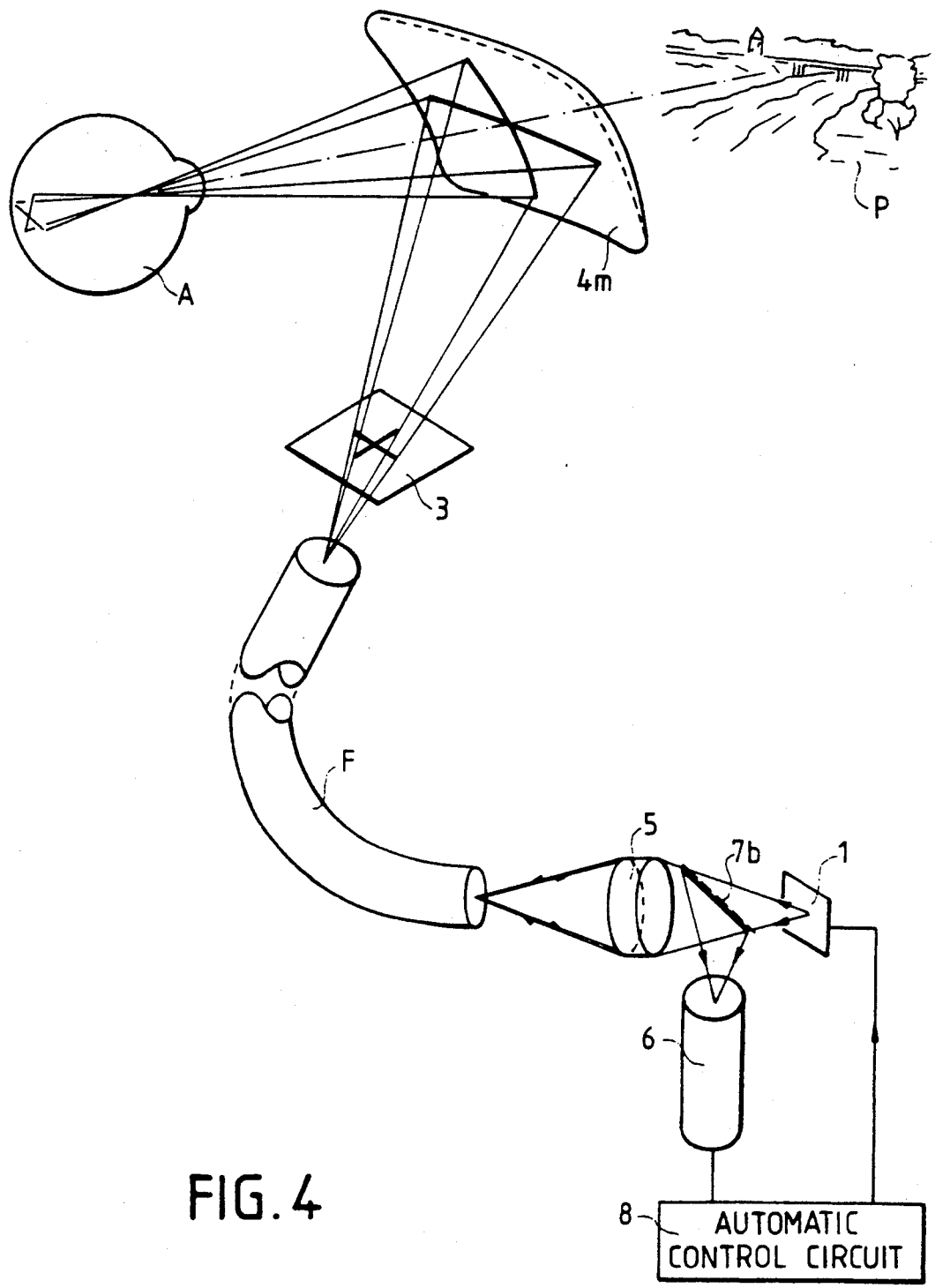

FIG. 4 shows another exemplary embodiment of an optical device according to the invention. This embodiment differs from the one of FIG. 3 in that the oculometer 6 is no longer borne by the observer's helmet but is fixedly joined to the optical elements starting from and including the light source 1 upto the input of the optic fibers F. It also differs therefrom in that, between the image generator 3 and the observer's eye A, it is the viewfinder of the helmet formed by a concave semi-transparent mirror, 4 m, through which the eye A observes the landscape P, that plays the role of both a collimation optical piece and a mixing mirror. In this embodiment, the pupil of the eye is observed, by the oculometer 6, by means of a separating glass 7b formed by a semi-transparent mirror positioned on the optical path between the projection optical piece 5 and the light source 1. As for the condenser 2 of FIG. 3, it is eliminated so as to achieve the maximum reduction in the weight of the observer's helmet on which all that is mounted now is the image generator and an end of the optical fibers F. This elimination is possible because, in the example according to FIG. 4, the useful surface of the image generator is far smaller than (more than twice as small as) that of the collimation optical piece 4 m. However, with identical image generators, the resolution of the image seen by the eye is appreciably lower than what is obtained in the case of FIG. 3.

The optical device according to FIG. 4 has been fitted out, in one of its versions, with the electronic assembly according to FIG. 5 to correct the distortions brought by the collimation optical device, formed by the 4 m mirror, into the image seen by the eye.

The present invention is not restricted to the example described. It is thus that, in particular, it concerns optical devices where the light source 1 would transmit its light to the image generator 3 not by a path including a flexible optical conductor but by a path in which all the elements are mechanically fixed to one another. Conversely, an example may be envisaged where an optical device according to the invention is made so as to be fitted out with a flexible optical conductor positioned between the image generator and the eye.

The invention can be applied also to the case where the image to be obtained has to be polychromatic, for example by the merging, on the retina of the eye, of three images, one generated in red, one in green and one in blue. Irrespectively of the way in which these three images are generated, and of the way in the merging on the retina is done, it is possible to compensate for the off-axis chromatic defects of the optical elements positioned on the path of each of the images. For this purpose, each image may be processed separately by an assembly of the type described with reference to FIG. 5.

The invention can be applied also to devices designed for the display of data collimated to infinity without its being possible to observe a landscape and any other view simultaneously. It can be applied also to binocular display where the devices relating to both eyes may have common parts by means of semi-transparent mirrors but may have a distinct oculometer and a distinct automatic control circuit for each eye.

What is claimed is:

1. An optical device for the display of light data collimated to infinity, comprising display means, an oculometer and an automatic control circuit, wherein the display means include an image generator to give an image and a collimation optical piece to receive the image given by the generator and to give a human eye an image collimated to infinity from the image given by the generator, wherein the display means have an exit pupil with a diameter smaller than that of the pupil of the eye, the position of said displayed exit pupil being adjustable, wherein the oculometer is designed to give a position signal, representing the coordinates of the center of the pupil of the eye, and wherein the automatic control circuit is designed to receive the position signal and to command the display means so that the exit pupil is centered on the pupil of the eye.

2. An optical device according to claim 1, wherein the display means include a matrix of electroluminescent diodes and an optical system to form an image of the diodes of the matrix in a zone where the display is done by the eye and wherein the command applied by the automatic control circuit consists in permitting the lighting up of at least one diode of the matrix, the image of which, given by the optical system, is substantially in the vicinity of the center of the pupil of the eye.

3. An optical device according to claim 1, wherein the collimation optical piece produces distortions and wherein the optical device includes a transcoder device to modify the characteristics of the image generator, as a function of the position signal, so that the image produced by the image generator has distortions which are the reverse of those produced by the collimation optical piece.

4. An optical device according to claim 1, wherein the display means are borne at least partially on a helmet and wherein the oculometer is borne by the helmet.

5. An optical device according to claim 1, wherein the display means include a bundle of flexible optical fibers, a first part fixedly joined to a helmet and a second part optically coupled to the helmet by the bundle of flexible optical fibers, and wherein the oculometer is fixedly joined to the second part and is designed to observe the eye by an optical trajectory including the optical fibers.

* * * * *